Nov. 18, 1930.     R. G. ROTH     1,781,734
HAND RAKE CLEANING ATTACHMENT
Filed April 9, 1930
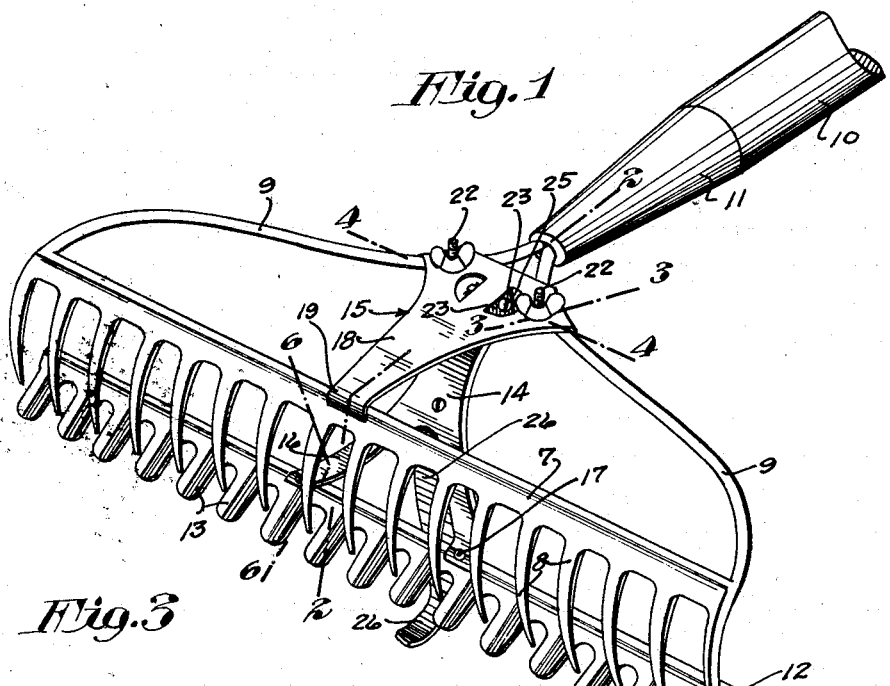
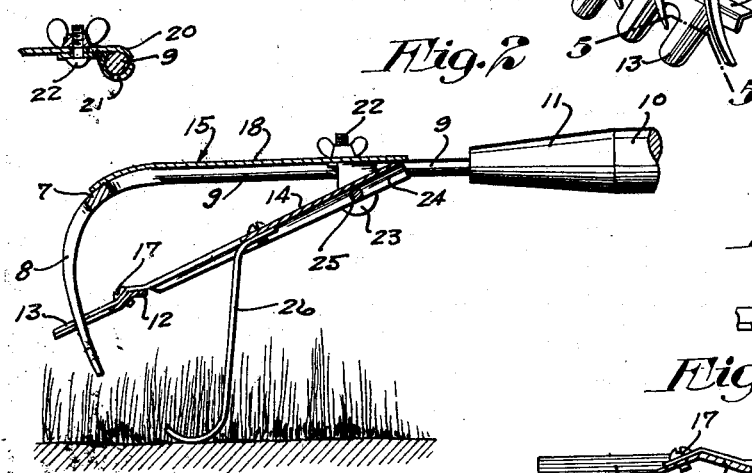
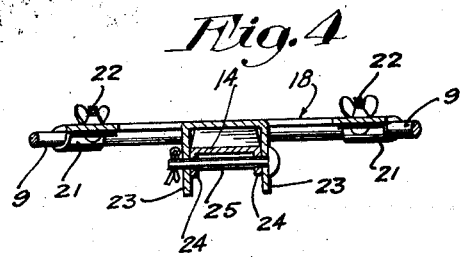
Inventor
Robert G. Roth
By his Attorneys
Merchant and Tieson Patented Nov. 18, 1930

1,781,734

UNITED STATES PATENT OFFICE

ROBERT G. ROTH, OF MINNEAPOLIS, MINNESOTA

HAND-RAKE-CLEANING ATTACHMENT

Application filed April 9, 1930. Serial No. 442,946.

My invention relates to hand or garden rakes and has for its object to provide a simple and highly efficient attachment therefor that is of relatively light-weight, easy to apply to a commercial rake and that will automatically strip or remove leaves, grass or the like from the teeth of the rake. This stripping action prevents an accumulation of leaves, grass and the like that would interfere with the penetrating and retaining action of the teeth of the rake, and thus permit the same to be used with ease and speed.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a perspective view of a rake having the cleaning attachment applied thereto, a portion of the rake handle being broken away;

Fig. 2 is a view partly in side elevation and partly in section taken on the line 2—2 of Fig. 1;

Fig. 3 is a fragmentary detail view principally in section taken on the line 3—3 of Fig. 1, on an enlarged scale;

Fig. 4 is a detail view principally in section taken on the line 4—4 of Fig. 1, on an enlarged scale;

Fig. 5 is a fragmentary detail view partly in section taken on the line 5—5 of Fig. 1, on an enlarged scale; and Fig. 6 is a fragmentary detail view with a part thereof sectioned on the line 6—6 of Fig. 1.

Of the parts of the commercial hand or garden rake illustrated, the numeral 7 indicates the head, 8 the teeth, 9 the arms on the ends of said head, and which arms are in converging relation and secured in an axial bore in a wooden handle 10 that is reinforced by a ferrule 11.

The cleaning attachment includes a body in the form of a bar 12, inward of the teeth 8 under the arms 9, and which bar extends parallel to the head 7 and has formed therewith short, wide stripper fingers 13 that project forward between the teeth 8. To stiffen the bar 12 and fingers 13 the same are transversely bent so that they are V-shaped in cross section. The cleaning device is carried by a short, wide arm 14 pivoted to a clamp 15 for vertical swinging movement and having a pair of forwardly projecting fingers 16 that are in diverging relation, transversely overlie the bar 12 at the longitudinal center thereof and are rigidly secured thereto by screws 17.

The clamp 15 includes a flat plate 18, which rests on the head 7, at the longitudinal center thereof, and on the arms 9, at their inner end portions. On the front end of the plate 18 is a short depending hook 19 which engages the face of the head 7 to prevent rearward shifting movement of the clamp 15 on the head 7 and arms 9 and on the rear end of said plate is a pair of transversely spaced short hooks 20 that engage the outer faces of the arms 9 and hold the clamp 15 against forward or edgewise shifting movement on said head and arms.

Cooperating with the hooks 20 is a pair of clips 21 secured to the plate 18, on the under side thereof, by a pair of thumb-nut equipped bolts 22, see Fig. 3. These clips 21 have segmental end portions which fit around the under sides of the arms 9 and rigidly hold the plate 18 clamped thereon.

Punched and pressed from the plate 18 between the hooks 20 is a pair of laterally spaced depending bearing ears 23 between which the rear end portion of the arm 14 extends and is held thereby against edgewise shifting movement. The outer longitudinal edge portions of the arm 14 and fingers 16 are turned downward to form reinforcing flanges 24. A nut-equipped bolt 25 extends through the bearing ears 23 and reinforcing flanges 24 and hingedly connects the arm 14 to the clamp 15 for vertical swinging movement.

During raking action the cleaning attachment is held raised by a downwardly and forwardly projecting ground-engaging shoe 26 rigidly secured to the under side of the arm 14 at the junction of the fingers 16 therewith. The lower end portion of the shoe 26 is curved upwardly both forwardly and rearwardly so as to freely ride over the ground during raking action. The length of the shoe 26 is such that when the teeth 8 of the rake are on the ground the cleaning device is held raised so as to not interfere with raking action.

To strip the rake teeth 8 of leaves, grass and the like, said rake is lifted to carry the shoe 26 out of contact with the ground and permit the cleaning device to drop by gravity and thereby carry its stripping fingers 13 downward between the teeth 8. When the rake is again lowered for raking action, the shoe 26 first engages the ground and thereby lifts the cleaning attachment which carries its stripper fingers 13 to the upper extremities of the teeth 8 by the time said teeth come in contact with the ground.

The above described cleaning attachment can very easily and quickly be attached to a commercial rake without the use of tools and without changing or mutilating the rake in any manner whatsoever.

What I claim is:

A device of the class described comprising a clamp including a plate adapted to rest on the head and arms of a rake and having short depending hooks engageable with said head and arms to hold the plate against bodily shifting movement thereon and clips for securing the plate to said arms, an arm hinged to the clamp for vertical swinging movement, a body carried by the arm and having stripper fingers arranged to project between the teeth of the rake, and a shoe on the arm arranged to slide on the ground during raking action and hold the body raised.

In testimony whereof I affix my signature.

ROBERT G. ROTH.